United States Patent [19]

Malay

[11] Patent Number: 4,539,269

[45] Date of Patent: Sep. 3, 1985

[54] LOW PROFILE SEAL

[75] Inventor: Manuel R. Malay, Brunswick, Ohio

[73] Assignee: Union Carbide Corporation, Danbury, Conn.

[21] Appl. No.: 683,958

[22] Filed: Dec. 20, 1984

Related U.S. Application Data

[63] Continuation of Ser. No. 511,910, Jul. 8, 1984, abandoned.

[51] Int. Cl.³ .............................................. H01M 2/12
[52] U.S. Cl. ...................................... 429/54; 429/168
[58] Field of Search ...................... 429/53, 54, 55, 56, 429/168

[56] References Cited

U.S. PATENT DOCUMENTS

| | | | |
|---|---|---|---|
| 2,243,938 | 6/1941 | Anthony | 429/168 |
| 3,318,737 | 5/1967 | Watanabe et al. | 136/133 |
| 3,802,923 | 4/1974 | Spanur | 429/54 |
| 4,063,902 | 12/1977 | Heinz | 29/623.2 |
| 4,146,681 | 3/1979 | Spanur | 429/54 |

FOREIGN PATENT DOCUMENTS 1213467 4/1960 France .
2349966 11/1977 France .

Primary Examiner—Donald L. Walton
Attorney, Agent, or Firm—John C. LeFever

[57] ABSTRACT

A galvanic cell having a closure member which contains a resealable vent comprising the inwardly turned peripheral edge portion of the cell container and a closure member having a resilient peripheral lip and a resilient annular flange, the low profile construction of which allows for increased amounts of reactive material to be placed within the cell container.

6 Claims, 2 Drawing Figures

LOW PROFILE SEAL

This application is a continuation of application Ser. No. 511,910, filed July 8, 1984, now abandoned.

FIELD OF THE INVENTION

This invention relates to cylindrical galvanic cells and more specifically to galvanic cells having a compact resealable vent comprising the inwardly turned peripheral edge portion of the cell container and a closure member having a resilient peripheral lip and a resilient annular flange, the construction of which resealable vent allows for increased amounts of reactive material to be placed within the cell container.

BACKGROUND OF THE INVENTION

Under certain conditions galvanic cells may generate large quantities of gas. As these cells are sealed in order to prevent loss of electrolyte, such gas generation may result in the formation of high pressures within such cells. If such high pressures are not vented, cell leakage, bulging and/or rupture may occur.

In the past many approaches have been adopted for releasing the internal pressure which may build up in galvanic cells. In general, it is preferable to employ resealable venting means in order to avoid drying out of the electrolyte and to prevent the ingress of oxygen from the atmosphere which can cause wasteful corrosion of the anode. One significant drawback encountered with several of the prior art resealable vents has been that they require the addition of several or more parts in the dry cell and thus can greatly increase the cost of manufacture. Additionally, these prior art approaches frequently require that these additional parts must be accurately positioned during cell assembly if reliable and reproducible results are to be obtained.

Among the resealable venting means developed in the prior art to overcome the above-described drawbacks are the dry cell constructions disclosed in U.S. Pat. Nos. 3,802,923 and 4,146,681. U.S. Pat. No. 3,802,923 discloses a "rim vent" seal closure for the open end of a cell comprising a cover including an annular depending flange which has a circumferential notch for engaging the inwardly turned peripheral edge of the cell and a resilient sealing lip which resides on the curled over top portion of the container. U.S. Pat. No. 4,146,681 discloses an improved version of such cover wherein an annular recess is located in the cover, which recess extends below the level of the notch, and a locking collar is inserted into such recess.

Although the seal closures of the above patents function admirably, such seals require a large crimp radius. As a result the cell volume is not fully utilized and cathode mix height is not maximized.

It is therefore an object of this invention to provide a resealable vent closure for use in a galvanic dry cell.

Another object of this invention is to provide a resealable vent closure which requires a minimum number of parts and which is therefore easy to assemble and inexpensive to manufacture.

An additional object of this invention is to provide a resealable vent closure which will permit a maximum amount of active material to be placed inside the cell container.

Still another object of this invention is to provide a method for the production of galvanic cells which possess a resealable vent closure.

The foregoing and additional objects will become more fully apparent from the following description and the accompanying drawing.

SUMMARY OF THE INVENTION

This invention relates to a galvanic cell comprised of a cylindrical container having a closed end, an open end and an upstanding wall with an inwardly turned peripheral edge portion, said edge portion having an inner surface and an outer surface, said container including therein electrochemically active ingredients; and a closure member disposed over the open end of said container, said closure member comprising a resilient annular flange extending toward the closed end of said container, said flange defining an outer circumferential notch and being positioned such that the inwardly turned peripheral edge portion of the container is inserted into such circumferential notch; characterized in that the inwardly turned peripheral edge portion of the container is inwardly crimped at an angle of between about 85° and about 95°, preferably about 90°, relative to the upstanding wall of the container, and said closure member further comprises an outer sealing lip which extends substantially parallel to and is in contiguous sealing relationship with the outer surface of the inwardly turned peripheral edge portion of the container, said lip having an inner face and defining a circumferential groove in said inner face, such that the sealing lip and inwardly turned peripheral edge portion of the container comprise a resealable venting means operable in that the buildup of pressure inside the cell beyond a predetermined limit will cause said sealing lip to momentarily deflect, thereby permitting the release of such pressure from inside the cell.

In another aspect this invention relates to a method for the production of galvanic cells having a resealable vent closure comprising the steps of:

(a) assembling within a cylindrical container having an open end, a closed end and an upstanding wall the electrochemically active ingredients of the cell;

(b) inwardly crimping the peripheral edge portion of said cylindrical container such that said peripheral edge portion is inwardly turned at an angle of between about 85° and about 95° relative to the upstanding wall of the container, such that said peripheral edge portion has an inner and an outer surface;

(c) providing a closure member comprising a resilient annular flange and a sealing lip having an inner face; said flange defining an outer circumferential notch, said sealing lip defining in its inner face a circumferential groove; and (d) locking said closure member into place by inserting it over the open end of said cylindrical container such that the end of the inwardly turned peripheral edge portion of the cell container is fitted into the circumferential notch on said flange such that said sealing lip extends substantially parallel to and is in contiguous sealing relationship with the outer surface of the inwardly turned peripheral edge portion of the container.

It is to be noted that the inward crimping of the peripheral edge portion of the cell container may involve a multiple-step procedure—i.e. the container could be partially inwardly crimped, the closure member positioned over the open end of the container, and the closure member locked into place by completing the crimping of the cell so that the peripheral edge portion of the container is at an angle of between about 85° and 95° relative to the sidewall of the container. Thus in another particularly preferred embodiment this invention relates to a method for the production of galvanic cells having a resealable vent closure comprising the steps of:

(a) assembling within a cylindrical container having an open end, a closed end and an upstanding wall the electrochemically active ingredients of the cell;

(b) inwardly crimping the peripheral edge portion of said cylindrical container such that said peripheral edge portion is inwardly turned at an angle of between about 30° and about 60° relative to the upstanding wall of the container;

(c) providing a closure member comprising a resilient annular flange, and a sealing lip having an inner face; said flange defining an outer circumferential notch, said sealing lip defining in its inner face a circumferential groove; and (d) locking said closure member into place by inserting it over the crimped peripheral edge portion of the cylindrical container and further crimping said peripheral edge portion such that said peripheral portion is inwardly turned at any angle of between about 85° and about 95° relative to the upstanding wall of the container such that said peripheral edge portion has an inner and an outer surface that the end of the inwardly turned peripheral edge portion of the cell container is fitted into the circumferential notch on said flange such that said sealing lip extends substantially parallel to and is in contiguous sealing relationship with the outer surface of the inwardly turned peripheral edge portion of the container.

Most preferably the cell container is inwardly crimped at an angle of about 45° relative to the upstanding wall of the container in step (b). As will be apparent to one skilled in the art, the outer portion of the container sidewall in the area of the crimp should be restrained to avoid bulging at that point.

The raw cell produced by the process of this invention may then be finished by locking an outer jacket to conventional covers.

The closure member of this invention is composed of a resiliently deformable plastic such as nylon, polyethylene or polypropylene. Typically, the closure member is molded in a one-piece construction utilizing conventional molding techniques well known to those skilled in the art.

The closure member may be molded defining a central hole such that an electrode such as a carbon rod can be force-fitted through said closure member. The seal around the electrode may be assisted by silicone grease or other sealant or adhesive-type material. In some embodiments of this invention the closure member will comprise an inner circular flanged hub about such central hole.

The resilient annular flange of the closure member defines an annular notch in its outer side wall. This flange is positioned such that this notch engages the inner edge on the inwardly crimped peripheral edge of the cell container thereby locking the cover in place and forming a seal juncture therewith. This seal juncture is made tight enough to retard the outward free flow of liquid spew but is not made so tight as to preclude the passage of gas therethrough.

In order to enhance the effectiveness of the fluid-tight seal, a thin layer of non-hardening and non-melting grease may be applied to the outer surface of the inwardly crimped peripheral edge portion of the cell container. This thin layer of grease also repels moisture and serves as a lubricant to aid in the assembly of the cell closure.

The peripheral sealing lip of the closure member defines a circumferential groove in its inner surface. In some embodiments of this invention one or more radial indentations are provided in the outer face of the sealing lip. These indentations assist the cell to vent when inner gas pressure builds up. Since the lip seal is thinner and is not in contact with the top cover where the indentations are, gas pressure can flex these thin areas up and vent the cell without stretching the jacket.

The periphery of the sidewall of the cylindrical cell container, which in cells of the Leclanche or zinc chloride type may be composed of the consumable (zinc) anode, is crimped inward to form a flattened flange. The crimp radius for the about 85° to about 95° angle bend is preferably about 1/16 inch (about 0.16 cm). Because of this crimping, the initial height of the cylindrical container should be increased to compensate for the inwardly crimped peripheral edge.

The cells of this invention are typically prepared as follows. The cell's active materials along with a separator and electrolyte are assembled in a cylindrical container. In certain cell systems, such as those of the Leclanche or zinc chloride type, the cylindrical container may be an anode of a consumable metal, such as zinc. The peripheral edge portion of the cylindrical container is crimped inward at an angle of between 85° and about 95° relative to the upstanding wall of the container. The closure member is then placed over the open end of the cell container and is snapped into position such that the peripheral edge portion of the cell container is inserted into the groove located on the outer wall of the annular flange of the closure member. Alternatively and preferably, the peripheral edge portion of the container could be inwardly crimped part way, preferably about 45° relative to the upstanding wall of the container, the closure member inserted, and the crimping completed such that the peripheral edge portion of the cell container is at an angle of between about 85° and 95° relative to the upstanding wall of the container. The raw cell so formed is then finished by locking conventional top and bottom covers to an outer jacket placed around the cell. The top cover may serve the additional function of pressing the sealing lip of the closure member against the outer surface of the turned-in portion of the cylindrical container.

In the design of a particular low profile seal, there are a number of variables which must be taken into account. The pressure required for the sealing lip to deflect, thus allowing excess presssure to be released from the cell, is dependent upon the physical properties of the closure member material as well as upon the dimensions of the particular closure member involved.

In addition, the pressure required for the cells of this invention to vent may also depend upon the composition of the outer jacket (if such jacket is employed) as well as the amount of force exerted by the cell cover against the closure member. Thus, a loosely fitted cell cover (i.e. one which does not exert force against the closure member) will not affect the venting pressure whereas a tightly fitted cover will increase the venting pressure. The extent to which a tightly fitted cover will increase the venting pressure will depend in part upon the composition of the outer jacket. A rigid steel jacket can greatly increase the venting pressure whereas a yielding paper jacket will increase the venting pressure to a lesser degree.

When a metal outer jacket is employed it is preferred that a butt seam be employed for the outer jacket, although lap or lock seams may also be employed. When a butt seam is employed, the folding of the jacket over the ends of the container to lock the covers thereto may cause such seam to split. However, the sealing integrity of such seam may be ensured by depositing a layer of an adhesive material between the container and the jacket in the seam area.

The sealing lip of the closure member may define one or more radial indentations in its upper surface. When a tightly fitted cover is employed in conjunction with a rigid metal jacket, the presence of such indentations may be necessary for the lip to deflect and the cell to vent.

The present invention will become more apparent from the following description thereof when considered together with the accompanying drawing which is set forth as being exemplary of the present invention and is not intended to be limitative thereof in any respect.

DETAILED DESCRIPTION OF THE DRAWING

Figure 1:
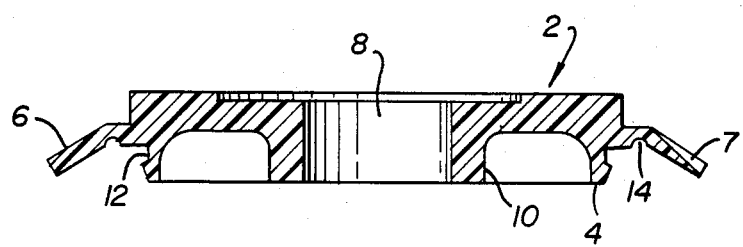
FIG. 1 is a cross-sectional view of a closure member of the cell of the present invention in its as-molded form, of a construction particularly useful in cells of the Leclanche or zinc chloride type.

Referring now to FIG. 1, closure member 2 is comprised of annular flange 4 and sealing lip 6. Typically, closure member 2 will define central hole 8, which hole is of a diameter such than an electrode, e.g. a carbon rod, may be force-fitted therethrough. In order to improve the seal of the closure member about such electrode, closure member 2 may further comprise inner circular flanged hub 10 extending about central hole 8, which hub may be beveled in part to ease insertion of the central electrode through said hole. At the junction of hub 10 and the central electrode there may be placed silicone grease or other sealant or adhesive type material to seal such juncture.

Annular flange 4 defines circumferential notch 12 in its outside face. Flange 4 is positioned such that the inwardly turned peripheral edge of the cell container may be inserted into circumferential notch 12.

Circumferential groove 14 is defined in the inner surface of sealing lip 6. This groove functions as a hinge and permits sealing lip 6 to function as a flapper valve. Moreover, said sealing groove additionally functions as a gas distribution channel. Sealing lip 6 is molded at an angle, typically about 30° for polypropylene, and therefore exerts sealing pressure when substantially horizontally disposed in the assembled cell. In some embodiments of this invention, one or more radial indentations 7 are defined in the outer surface of the sealing lip.

Figure 2:
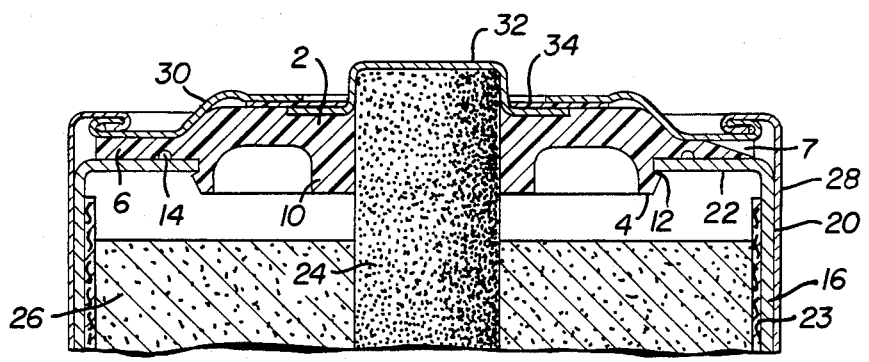
FIG. 2 is a partial sectional view of a D-size cell employing the low profile seal construction of this invention, utilizing the closure member of FIG. 1.

Referring in detail to FIG. 2, the cell diagrammed is composed of cylindrical container 16, which container 16 is comprised of a closed end (not shown), upstanding wall 20, and inwardly turned peripheral edge portion 22. Inwardly turned peripheral portion 22 is inwardly crimped at an angle of about 90° relative to upstanding wall 20. Disposed inside container 16, which is composed of a consumable metal anode such as zinc, is central carbon rod 24, which is surrounded by depolarizer mix 26. Depolarizer mix 26 is separated from container (anode) 16 by a separator 23.

Closure member 2 is disposed over the open end of container 16, with carbon rod 24 being force-fitted through the central hole defined by said closure member. Inner circular flanged hub 10 forms a seal with carbon rod 24. This seal may be aided by disposing silicone grease or other sealant or adhesive type material at such juncture.

Annular flange 4 defines circumferential notch 12 in its outside face, and is positioned such that the end of turned in peripheral edge portion 22 is inserted into notch 12.

Sealing lip 6 extends substantially parallel to and is in contiguous sealing relationship with the outer surface of inwardly turned peripheral edge portion 22. This seal may be aided by the deposition of silicone grease or similar sealing material. Circumferential groove 14 is defined in the inner surface of sealing lip 6.

Outer jacket 28, which may be composed of paper or of insulated metal, is disposed around, and extends beyond upstanding wall 20 of container 16. Cover 30 extends over closure member 2 and is locked to jacket 28 by conventional techniques. Preferably, however, a flat curl is utilized as this will provide for increased terminal clearance. As is shown in the figure a two-piece cover including metal electrode cap 32 and insulating washer 34 may be utilized. Cover 30 may or may not exert substantial pressure against sealing lip 6.

Having detailed the features of the cell of this invention, its manner of operation may now be described. Gas generated by the cell passes through the flange/peripheral edge portion of the cell container-interface and into circumferential groove 14. Pressure built up within the cell by such gas generation momentarily outwardly deflects sealing lip 6 thereby allowing the cell to be safely vented. Sealing lip 6 then reseals thereby preventing drying out of the cell as well as the ingress of oxygen from the atmosphere.

EXAMPLES

EXAMPLE 1

Several "F" size paper-lined zinc chloride cell batteries (Sample A) were constructed with each including four cells employing the low profile seal of this invention. Each cell contained 89.2 grams of zinc chloride cathode mix; an eight gage zinc anode; a paper separator; a carbon rod electrode; and a propylene closure member similar to that diagrammed in FIG. 1.

Additional batteries (Sample B) were constructed as above except that each cell contained 101 grams of the same cathode mix.

For comparative purposes, test data are provided for a number of lots of batteries (Sample C) made up of four cells each employing a closure member similar to the rim vent seal disclosed in U.S. Pat. No. 3,802,923. Each cell contained 90 grams of the same cathode mix employed above, and the individual sealed cells were encased in a plastic shrink tube.

Fresh batteries of each type, along with batteries of each type which had been stored at 45° C. for 3 months were discharged intermittently across a 9 ohm resistance according to two specific timing cycles. These cycles were (1) thirty minutes on drain, thirty minutes off drain, for eight hours per day and (2) thirty minutes on drain for one-half hour per day. These tests were continued until cutoff voltages of 3.0 volts and 2.6 volts were obtained. The results of such tests, in hours of actual discharge, are listed in Table I.

TABLE I

| | Service Data Testing[1] | | | | | | Stored Batteries[2] | | | | | |
|---|---|---|---|---|---|---|---|---|---|---|---|---|
| | Fresh Batteries | | | | | | | | | | | |
| | 9Ω 30/30[3] | | | 9Ω ½ hr/day | | | 9Ω 30/30 | | | 9Ω ½ hr/day | | |
| Sample | No.[4] | 3.0 Volts | 2.6 Volts | No. | 3.0 Volts | 2.6 Volts | No. | 3.0 Volts | 2.6 Volt | No. | 3.0 Volts | 2.6 Volts |
| A (low profile seal) | 2 | 18.0 | 20.7 | 2 | 20.1 | 21.5 | 2 | 18.2 | 20.8 | 2 | 20.3 | 21.3 |
| B (low profile seal) | 3 | 22.4 | 25.5 | 3 | 23.6 | 25.2 | 3 | 21.9 | 23.8 | 3 | 20.5 | 21.4 |
| C (rim vent seal) | 29 | 18.3 | 20.7 | 26 | 21.0 | 22.4 | 21 | 17.4 | 19.8 | 18 | 20.7 | 22.1 |

[1] In hours of actual discharge
[2] Batteries stored at 45° C. for 3 months
[3] Test schedule was thirty minutes on drain/thirty minutes off drain for 8 hrs/day.
[4] Number of batteries tested The results in Table I indicate that the cells of this invention possess fresh and delayed service maintenance levels which are comparable to cells having commercially utilized closures when both cells contain approximately equal amounts of cathode mix (Samples A and C). However, the low profile seal of this invention permits additional active material to be placed within the cell (Sample B), thereby generating about a 20% increase in fresh service and about a 9% increase in delayed service over such commercially utilized closure constructions.

EXAMPLE 2

Additional batteries of each type described in Example 1 were stored at 45° C., and the current of each was measured after 1, 3 and 6 month intervals. The results of such testing, in percentage of initial current maintenance, are listed in Table II.

TABLE II

| | Current Maintenance* | | | |
|---|---|---|---|---|
| | Number of | Month | | |
| Cell Sample | Batteries | 1 | 3 | 6 |
| A (low profile seal) | 3 | 81 | 73 | 61 |
| B (low profile seal) | 3 | 80 | 69 | 57 |
| C (control-rim vent seal) | 12 | 82 | 70 | 65 |

*As percentage of initial current

The above results indicate that cells employing the low profile seal of this invention possess a current maintenance comparable to that achieved by commercially employed cell constructions.

I claim:

1. A galvanic cell comprising a cylindrical container having a closed end, an open end and an upstanding wall with an inwardly turned peripheral edge portion, said edge portion having an inner surface and an outer surface, said container including therein electrochemically active ingredients; and a closure member disposed over the open end of said container, said closure member comprising a resilient annular flange extending toward the closed end of said container, said flange defining an outer circumferential notch and being positioned such that the inwardly turned peripheral edge portion of the container is inserted into said circumferential notch; characterized in that the inwardly turned peripheral edge portion of the container is inwardly crimped at an angle of between about 85° and about 95° relative to the upstanding wall of the container, and said closure member further comprises an outer sealing lip which is disposed at an angle of between about 85° and about 95° relative to the upstanding wall of the container, said lip extending substantially parallel to and in contiguous sealing relationship with the outer surface of the inwardly turned peripheral edge portion of the container, said lip having an inner face and defining a circumferential groove in said inner face, such that the sealing lip and inwardly turned peripheral edge portion of the container comprise a resealable venting means operable in that the buildup of pressure inside the cell beyond a predetermined limit will cause said sealing lip to momentarily deflect, thereby permitting the release of such pressure from inside the cell.

2. The galvanic cell of claim 1 wherein the inwardly turned peripheral edge portion of the cell container is inwardly crimped at an angle of about 90°.

3. The galvanic cell of claim 1 wherein one or more radial indentations are defined in the outer surface of the sealing lip.

4. The galvanic cell of claim 3 wherein an outer metal jacket is disposed about the cell container and is sealed utilizing a butt seam and wherein a layer of adhesive material is disposed between the cell container and said metal jacket in the seam area.

5. The galvanic cell of claim 4 wherein an outer cover is disposed over the closure member and is locked to the metal jacket utilizing a flattened curl.

6. The galvanic cell of claim 1 wherein the closure member is composed of a member of the group consisting of nylon, polyethylene and polypropylene.

* * * * *